United States Patent [19]
Minor

[11] Patent Number: 5,312,477
[45] Date of Patent: May 17, 1994

[54] ADSORPTION/REGENERATION PROCESS

[75] Inventor: James G. Minor, Winston Salem, N.C.

[73] Assignee: M & W Industries, Rural Hall, N.C.

[21] Appl. No.: 47,550

[22] Filed: Feb. 23, 1993

[51] Int. Cl.⁵ .............................................. B01D 53/04
[52] U.S. Cl. .................................... 95/99; 95/105; 95/106; 95/143; 95/902; 96/128; 96/130; 96/144
[58] Field of Search ............... 55/28, 59–62, 55/68, 75, 88, 179, 208, 389

[56] References Cited
U.S. PATENT DOCUMENTS

| | | | |
|---|---|---|---|
| 3,455,089 | 7/1969 | Mattia | 55/62 |
| 3,534,529 | 10/1970 | Mattia | 55/62 |
| 3,979,175 | 9/1976 | Kattan et al. | 55/88 X |
| 4,190,423 | 2/1980 | Winter | 55/62 X |
| 4,409,006 | 10/1983 | Mattia | 55/60 X |
| 4,414,003 | 11/1983 | Blaudszun | 55/59 X |
| 4,421,532 | 12/1983 | Sacchetti et al. | 55/62 X |
| 4,516,988 | 5/1985 | Winter | 55/59 |
| 4,689,054 | 8/1987 | Vara et al. | 55/62 X |
| 4,738,691 | 4/1988 | Frey | 55/88 X |
| 4,784,672 | 11/1988 | Sircar | 55/26 |
| 4,812,147 | 3/1989 | BeVier | 55/25 |
| 4,820,318 | 4/1989 | Chang et al. | 55/68 |
| 4,846,852 | 7/1989 | Schweitzer et al. | 55/31 |
| 4,859,216 | 8/1989 | Fritsch | 55/62 X |
| 4,902,312 | 2/1990 | Chang | 55/71 |
| 4,966,611 | 10/1990 | Schumacher et al. | 55/62 X |
| 5,064,447 | 11/1991 | Lee | 55/62 X |
| 5,069,689 | 12/1991 | Goldhaar | 55/61 |
| 5,071,450 | 12/1991 | Cabrera et al. | 55/66 |
| 5,122,165 | 6/1992 | Wang et al. | 55/38 |
| 5,164,355 | 11/1992 | Farris et al. | 55/66 X |
| 5,198,001 | 3/1993 | Knebel et al. | 55/59 X |

FOREIGN PATENT DOCUMENTS 55-015657 2/1980 Japan ........................... 55/75

Primary Examiner—Robert Spitzer
Attorney, Agent, or Firm—Speckman, Pauley & Fejer

[57] ABSTRACT

A process for removal of contaminants from a fluid stream comprising adsorbing the contaminants with an adsorbent, contacting the resulting contaminant-laden adsorbent with a heated fluid, incinerating a portion of the contaminant-laden fluid, mixing at least a portion of the products of combustion with the remaining portion of contaminant-laden fluid, recirculating the mixture of contaminant-laden fluid and combustion products through the adsorbent to increase the concentration of contaminants in the mixture, and incinerating at least a portion of the recirculated mixture.

17 Claims, 4 Drawing Sheets

Incinerator Fuel Valve Position

ADSORPTION/REGENERATION PROCESS

BACKGROUND OF THE INVENTION

1. Field of the Invention

This invention relates to a process and system for regeneration of an adsorbent used for removal of contaminants from fluid streams, in particular, for removal of volatile organic compounds (VOC's) and/or hazardous air pollutants (HAP's) by adsorption using a suitable adsorbent.

2. Description of Prior Art

Adsorption/regeneration processes in which an adsorber is cyclically operated first to adsorb a given material contained in a fluid stream passed through the adsorbent and then to give up the adsorbed material to a regeneration fluid passed through the adsorbent resulting in regeneration of the adsorbent and rendering the adsorbent suitable for additional adsorption of material are known. In a known system for solvent recovery, activated carbon is employed as an adsorbent through which an air stream containing the solvent is passed. The solvent is adsorbed by the activated carbon after which the saturated adsorbent is contacted with steam, which steam provides the heat of desorption, resulting in the solvent being desorbed from the carbon. The condensate containing the solvent is then distilled to recover the solvents and the condensate is then discharged. However, contaminants comprising water soluble solvents such as water-based ink preclude the use of a steam based system because the solvent is no longer distillable from the condensate and, thus, the condensate can no longer be discharged without further costly treatment for environmental reasons. The use of air as a substitute for steam for regeneration of carbon adsorbents is possible but is generally hazardous, particularly with respect to solvents containing methylethyl ketone, acetone and other very reactive hydrocarbons which would ignite on the carbon due to the exothermic reaction resulting from reactivity of activated carbon in the presence of oxygen at moderate temperatures. In order to use activated carbon under such conditions, use of inert gas is necessary, making such systems uneconomical.

Additional disadvantages of known adsorption/regeneration processes and systems include the requirement for substantial amounts of energy to heat the desorption fluid and dispose of the desorbed material in an environmentally acceptable manner.

To overcome certain of the problems associated with the use of activated carbon as an adsorbent, Japanese Patent 0,015,657 teaches a method for adsorption of volatile organic compounds using zeolite followed by desorption and incineration of the desorbed organic fumes. Similarly, U.S. Pat. No. 4,846,852 teaches a method for separating and recovering volatile solvents from exhaust air in which the exhaust air containing the volatile solvents is alternately flowed through two molecular sieve packed beds, adsorbing the solvents therein, after which heated air or inert gas is passed through the bed not used for adsorption to regenerate the molecular sieve. Finally U.S. Pat. No. 4,820,318 teaches a process for removal of volatile organic compounds from vapor streams using an adsorbent of hydrophobic molecular sieve which is subsequently regenerated by heating. As a result of the use of molecular sieves as adsorbents, which molecular sieves are made of silica and alumina oxides, the danger of fires is eliminated, thereby enabling use of air, as opposed to steam, for regeneration of the adsorbent.

U.S. Pat. No. 4,784,672 teaches a process for removal of trace hydrocarbon impurities, water and hydrogen sulfide from landfill gas using an integrated temperature swing adsorption-pressure process with an adsorbent of a layer of activated carbon over a layer of molecular sieve zeolite. U.S. Pat. No. 4,812,147 teaches a process for removal of multiple components from a gaseous stream by adsorption in which the gaseous stream is passed sequentially through separate and distinct adsorbent beds wherein only a portion of the more strongly sorbed component is removed in the first adsorbent bed and the remaining portion of the more strongly sorbed component and a second component are substantially adsorbed in the second adsorbent bed. Regeneration of the adsorbent beds is accomplished using an inert purge gas.

U.S. Pat. No. 5,122,165 teaches a process for removal of VOC's from liquid streams in a process system utilizing, among other components, a self-generative gas phase granular activated carbon contacted for collection of the VOC's from a gas effluent which has previously been purified by a foam collector, wet scrubber, demister pad and VOC condenser. Processes for producing carbon molecular sieves are taught by U.S. Pat. No. 4,902,312 and U.S. Pat. No. 5,164,355. U.S. Pat. No. 5,071,450 teaches a process for modifying/treating molecular sieve adsorbent in which carbon is deposited on the adsorbent in order to change the effective diameter of its micropore openings.

In known adsorption/regeneration processes in which molecular sieves and/or high silica zeolites are used to adsorb VOC's, followed by desorption/regeneration of the molecular sieve using air, the VOC's in the regeneration stream are typically incinerated. See Japanese Patent 0,015,657. However, such processes require substantial amounts of fuel for incineration of the VOC's.

SUMMARY OF THE INVENTION

It is an object of this invention to provide an adsorption/regeneration process for removal of contaminants, in particular VOC's and/or HAP's, from a fluid stream in which incineration of the VOC's and /or HAP's can be carried out with air using molecular sieves or other such adsorbents without any external fuel.

It is another object of this invention to provide an adsorption/regeneration process for the removal of VOC's and/or HAP's from a fluid stream in which the size of the incinerator required for incineration of the VOC's and/or HAP's is reduced over known incineration processes.

It is yet another object of this invention to provide an adsorption/desorption process suitable for removing very dilute concentrations of VOC's and/or HAP's from a fluid stream, on the order of 10-1000 ppm of VOC's and/or HAP's.

It is yet another object of this invention to provide an adsorption/regeneration process for removal of VOC's and/or HAP's from a fluid stream in which greater than 96% of the VOC's and/or HAP's in the fluid stream are captured and greater than 98% of the captured VOC's and/or HAP's are destroyed.

It is yet another object of this invention to provide an adsorption/regeneration process for removal of VOC's and/or HAP's from a fluid stream which enhances the efficiency of any incinerator by adsorbing the VOC's and/or HAP's exhausted by the incinerator and recirculating them to the incinerator inlet.

These and other objects of this invention are achieved in a process for removal of contaminants from a fluid stream in accordance with this invention comprising adsorbing the contaminants with an adsorbent to form a contaminant-laden adsorbent, contacting the contaminant-laden adsorbent with a heated fluid to form a contaminant-laden fluid, incinerating a first portion of the contaminant-laden fluid to form products of combustion, mixing at least a portion of the products of combustion with a remaining portion of the contaminant-laden fluid, recirculating the resulting mixture of the remaining portion of contaminant-laden fluid and products of combustion through the adsorbent, thereby increasing the concentration of contaminants in the mixture, and incinerating at least a portion of the recirculated mixture having said higher concentration of contaminants.

In accordance with a preferred embodiment of this invention, the adsorbent is a hydrophobic molecular sieve, high silica zeolite or other such adsorbent, and the heated fluid, that is regeneration fluid, is preferably air. It will be apparent to those skilled in the art that other regeneration fluids, such as inert gases, may also be employed.

In accordance with another embodiment of the process of this invention, a portion of the recirculated primary mixture containing increased concentrations of contaminants is mixed with a portion of the products of combustion from the incinerator, forming a secondary mixture of contaminants and products of combustion. The secondary mixture is then recirculated through the adsorbent, thereby increasing the concentration of contaminants in the secondary mixture and having reduced oxygen content. As a result of this cycle, the concentration of contaminants in the regeneration fluid stream is increased, the oxygen in the regeneration fluid is depleted, and, because only a portion of the regeneration fluid passing through the adsorber is introduced into the incinerator, a substantially smaller incinerator can be utilized. Also, due to the increased concentration of contaminants, preferably VOC's and/or HAP's in the regeneration fluid, combustion within the incinerator is self-sustaining without the addition of an external fuel; and because the exhaust gases from the incinerator, which have been depleted of oxygen, are recirculated to the adsorber bed to desorb the contaminants, the oxygen content of the recirculating gases is much lower than fresh air.

In accordance with a preferred embodiment of this invention, the regeneration fluid is air which is heated directly by mixing with the products of combustion from the incineration process.

In accordance with another embodiment of this invention, at least two adsorbers are utilized, one of which is operated in an adsorption mode while the other is operated in a regeneration mode. After the adsorber operating in the adsorption mode has become saturated with contaminants, the modes of operation of the two adsorbers are reversed.

A system for removal of contaminants from a fluid stream in accordance with the process of this invention comprises at least one adsorber containing an adsorbent, said adsorber having a desorption fluid inlet and a desorption fluid outlet, means for separating a primary stream of a desorption fluid from said desorption fluid outlet into a plurality of desorption fluid streams in communication with the desorption fluid outlet, an incinerator in communication with said means for separating said desorption fluid into a plurality of desorption fluid streams, mixing means for mixing one of the plurality of desorption fluid streams with products of combustion from the incinerator, said mixing means in communication with said desorption fluid, and means for introducing the resulting mixture into the adsorber. In accordance with a preferred embodiment of this invention, the adsorbent is a hydrophobic molecular sieve or a high silica zeolite.

BRIEF DESCRIPTION OF THE DRAWINGS

These and other objects and features of this invention will be better understood from the following detailed description in conjunction with the drawings wherein.

DESCRIPTION OF PREFERRED EMBODIMENTS

Figure 1:
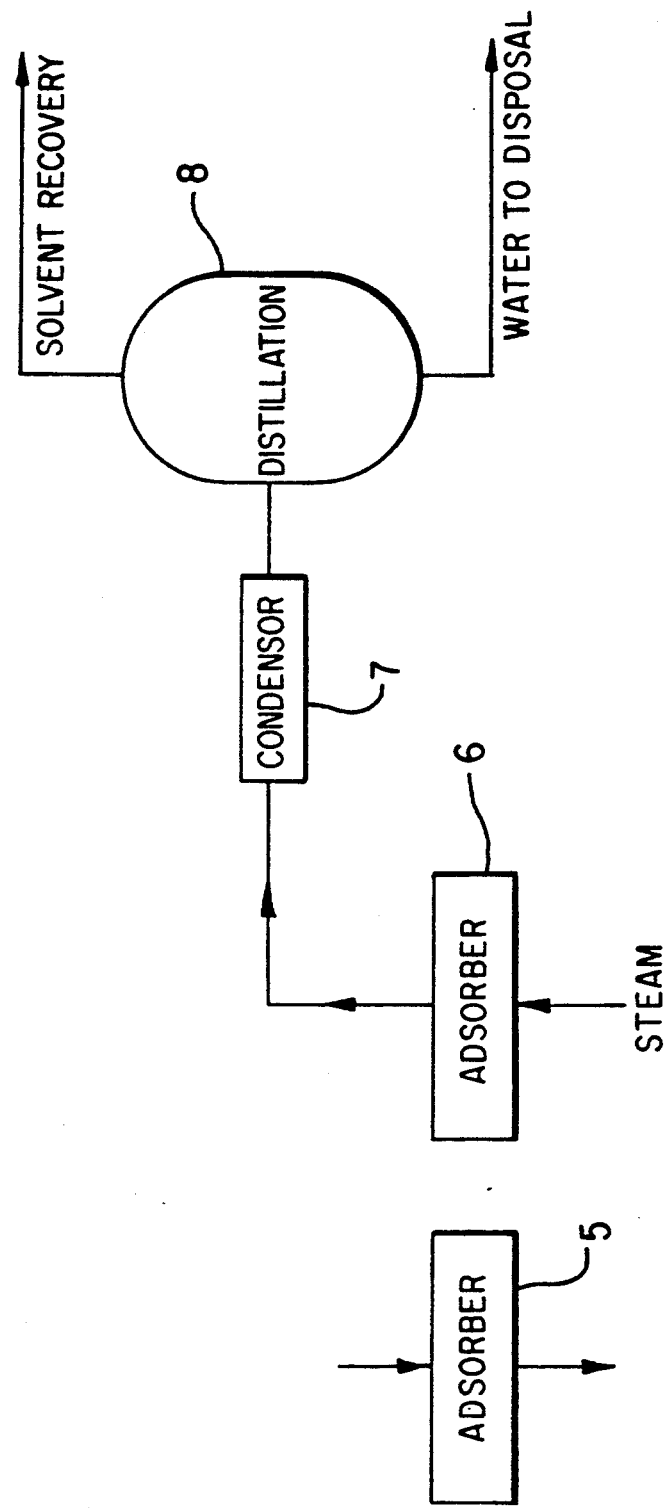
FIG. 1 shows a schematic diagram of a known activated carbon system for solvent recovery.

FIG. 1 shows a known activated carbon system for solvent recovery typical of systems currently in use. In accordance with such known systems, a fluid stream containing solvent is passed through one of adsorbers 5, 6 which are filled with activated carbon adsorbent beds resulting in adsorption of the solvent by the activated carbon adsorbent. While one of adsorbers 5, 6 is operating in an adsorption mode, the other adsorber 5, 6 is operated in a regeneration mode. In a regeneration mode, steam is introduced into adsorber 6, the steam providing the heat required for desorption of the solvent from the activated carbon adsorbent bed. The resulting solvent-laden steam is condensed in condenser 7 and the condensate is subsequently distilled in vessel 8 to recover the solvents. The condensate discharged from the distillation is disposed, for example, into a storm sewer. In the past few years, new environmental regulations have encouraged industry to change solvents, for example from toluene-laden inks, paints, etc. to water miscible materials, such as alcohols. As a result of such changes, the condensate containing alcohol is more difficult to distill and the condensate from the distillation process can no longer be discharged into sewers. The use of steam is necessitated by the fire hazard associated with regeneration of carbon with air especially when the solvents contain methylethyl ketone, acetone, or any other reactive hydrocarbons that could catch fire on the carbon due to an exothermic reaction in the presence of oxygen and high temperature.

The process of this invention overcomes these problems by utilizing hydrophobic molecular sieves, high silica zeolites or other such adsorbents, as adsorbents in place of activated carbon. Because the molecular sieves are made of silica and alumina oxides, no danger of fires from the use of air as a regeneration fluid exists thereby eliminating the necessity of steam as a regeneration fluid. Furthermore, because the recirculating regeneration fluid comprises incineration exhaust which is depleted of oxygen, the VOC level acceptable in air can be increased because the explosion limit is changed due to the oxygen content reduction. As a result, the solvent-laden air can be introduced into an incinerator for destruction of the solvents contained therein.

Figure 2:
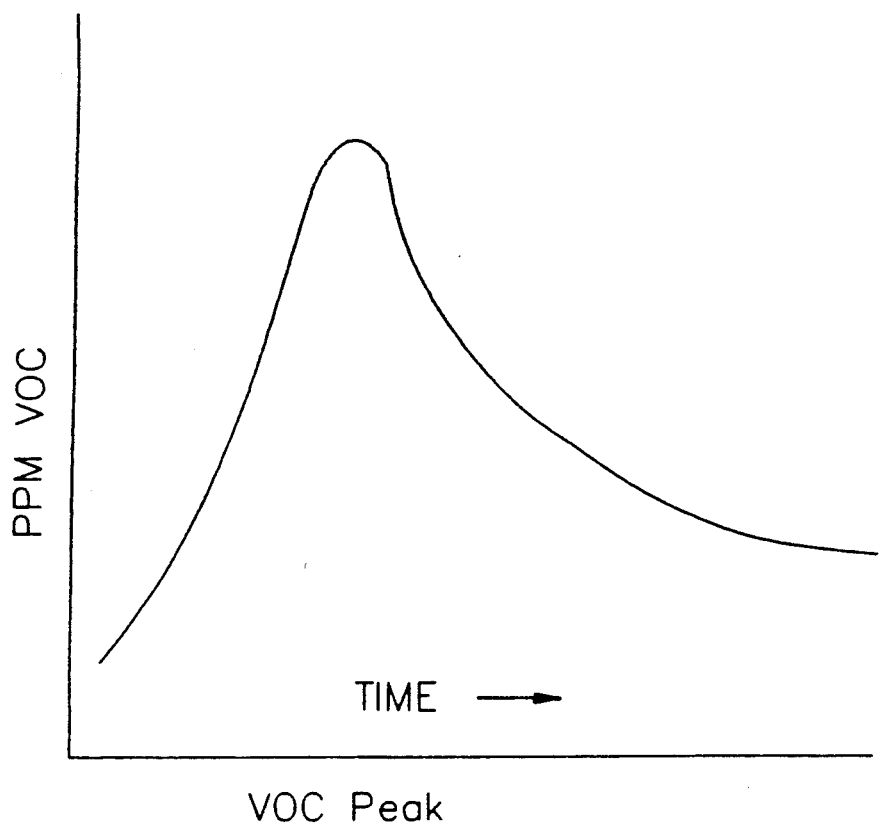
FIG. 2 shows a regeneration VOC profile for an adsorber in the process in accordance with one embodiment of this invention.
Figure 3:
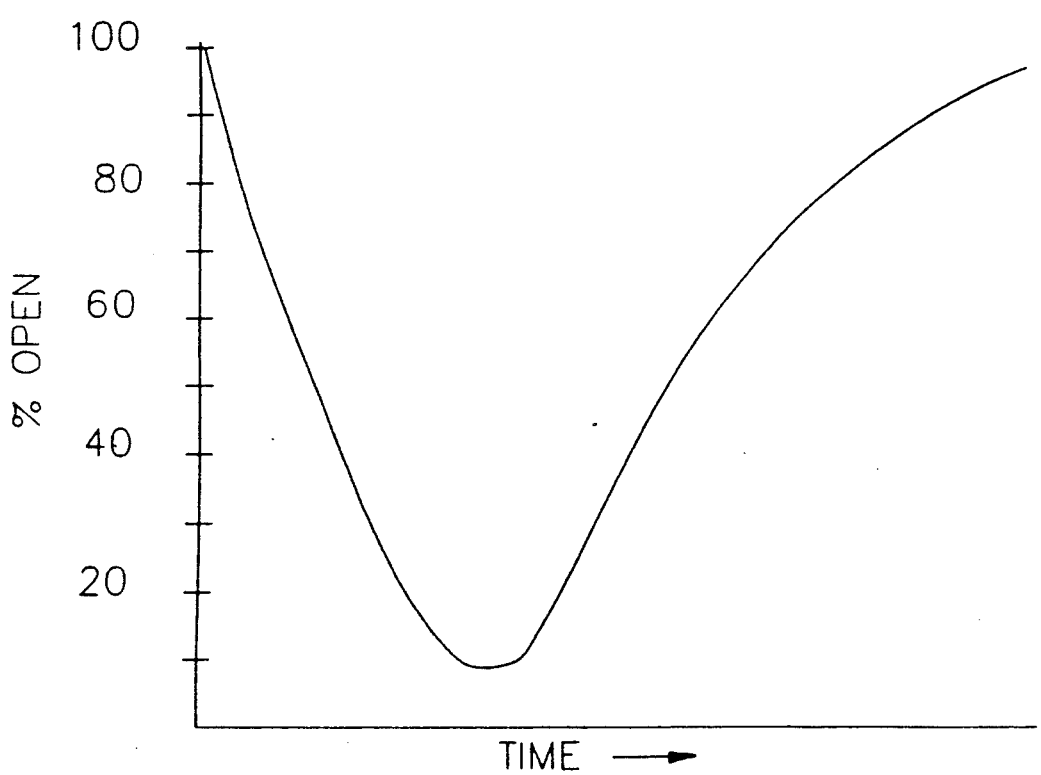
FIG. 3 is a graphic illustration showing the fuel valve position on an incinerator used in accordance with one embodiment of the process of this invention.
Figure 5:
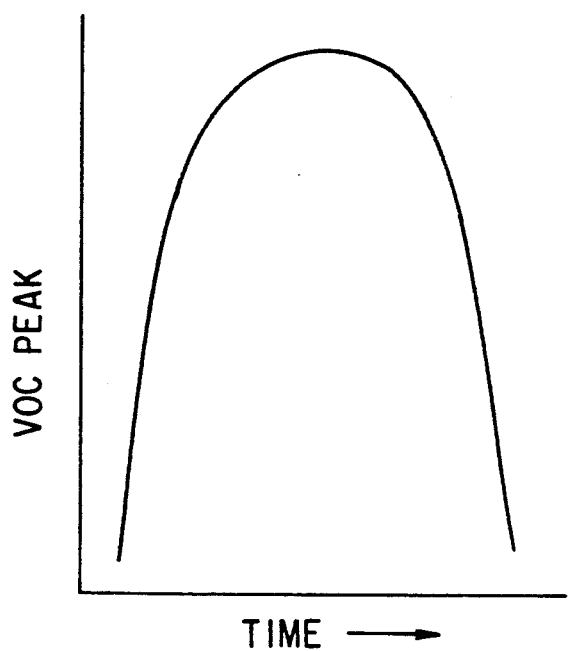
FIG. 5 is a graphic illustration showing the VOC content in the recirculating regeneration fluid.

It can be seen from FIGS. 2 and 3 that when the regeneration is carried out in an open cycle, volatile organic compounds (VOC) emitted from molecular sieve beds have a high peak appearing in the first third of the regeneration cycle which enables the reduction in external fuel required for operation of the incinerator. However, the remaining two-thirds of the time, external fuel is required to operate the incinerator. The process of this invention enables a reduction in external fuel required for incineration by recirculating the regeneration fluid, thereby increasing the duration of the VOC peak as shown in FIG. 5.

Figure 4:
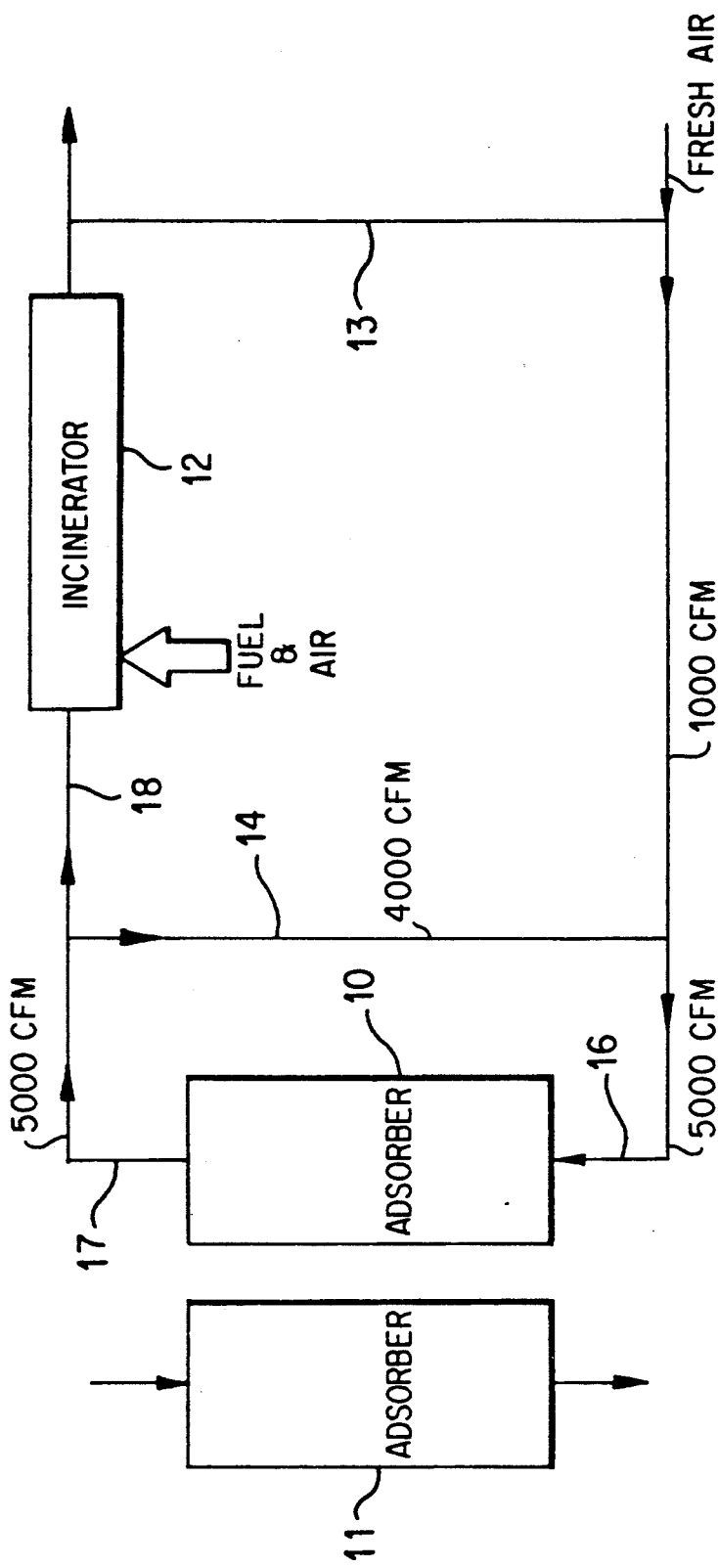
FIG. 4 is a schematic diagram showing one embodiment of the process of this invention.

In accordance with one embodiment of the process of this invention as shown in FIG. 4, the amount of external fuel required for incineration and, indeed, the incinerator size, can be reduced by recirculating a portion of the regeneration fluid such that only a small portion of the regeneration fluid is actually introduced into incinerator 12. In accordance with this embodiment, a fluid stream containing contaminants is introduced into adsorber 10, 11 in which the contaminants in the form of volatile organic compounds and/or hazardous air pollutants are adsorbed on an adsorbent, forming a contaminant-laden adsorbent. It will be apparent to those skilled in the art that adsorber 10, 11 may be any type of adsorption system including adsorbent wheels, pressure swing adsorption systems and temperature swing adsorption systems. In accordance with a preferred embodiment of this invention, the adsorbent is a hydrophobic molecular sieve. The contaminant-laden adsorbent is contacted with a heated fluid, that is, a regeneration fluid, introduced into adsorber 10 through process flow line 16, forming a contaminant-laden fluid. Upon exiting from adsorber 10 through process line 17, a portion of said contaminant-laden fluid is introduced through process line 18 into incinerator 12 and incinerated, forming products of combustion. At least a portion of the products of combustion exhausted from incinerator 12 are recirculated through process line 13 back to adsorber 10. Prior to introduction into adsorber 10, the products of combustion flowing through process line 13 and the remaining portion of contaminant-laden fluid flowing through process line 14 are mixed. The resulting mixture of contaminant-laden regeneration fluid and said portion of products of combustion is recirculated through adsorber 10, thereby increasing the concentration of contaminants in the mixture. At least a portion of said recirculated primary mixture having an increased concentration of contaminants is introduced into incinerator 12. Due to the increased concentration of contaminants in said recirculated primary mixture, the fuel value thereof is increased, enabling a reduction in the amount of external fuel introduced into incinerator 12.

By way of example, as shown in FIG. 4, the volume of heated fluid passing through adsorber 10 is 5,000 cubic feet per minute of which 1,000 cubic feet per minute is directed into incinerator 12 and the remaining 4,000 cubic feet per minute is recycled to adsorber 10.

Of the products of combustion emitted by incinerator 12, 1,000 cubic feet per minute is mixed with the 4,000 cubic feet per minute of contaminant-laden regeneration fluid and introduced into adsorber 10. As a result, the total amount of solvent in the regeneration fluid introduced into incinerator 12 has a substantially higher VOC peak average as shown in FIG. 5. The total VOC's in ppm does not change, but because the rate of flow into incinerator 12 is only one-fifth of the total amount of regeneration fluid, the total VOC's in the stream increases by a factor of 5. As a result of this concentration increase, the process for removal of contaminants from a fluid stream in accordance with this invention is particularly useful for processing fluid streams containing very low concentrations of contaminants, namely on the order of 10–1000 ppm of VOC's. In addition, not only is it possible to operate the incinerator without any external fuel, but also, the size of the incinerator may be reduced, thereby reducing the overall incinerator cost.

As shown in FIG. 4, a plurality of adsorbers may be used in the process of this invention, one of which is operated in a regeneration mode while the other is operated in an adsorption mode.

It will be apparent to those skilled in the art that one of the benefits of the process of this invention is the elimination of heat exchange means for heating the regeneration fluid prior to introduction into adsorber 10. By mixing a portion of the contaminant-laden fluid directly with the products of combustion from incinerator 12, the regeneration fluid is heated.

In accordance with one embodiment of the process of this invention, air is used as a regeneration fluid. However, as a result of mixing of the regeneration fluid with products of combustion from incinerator 12, the regeneration fluid becomes depleted of oxygen.

Figure 6:
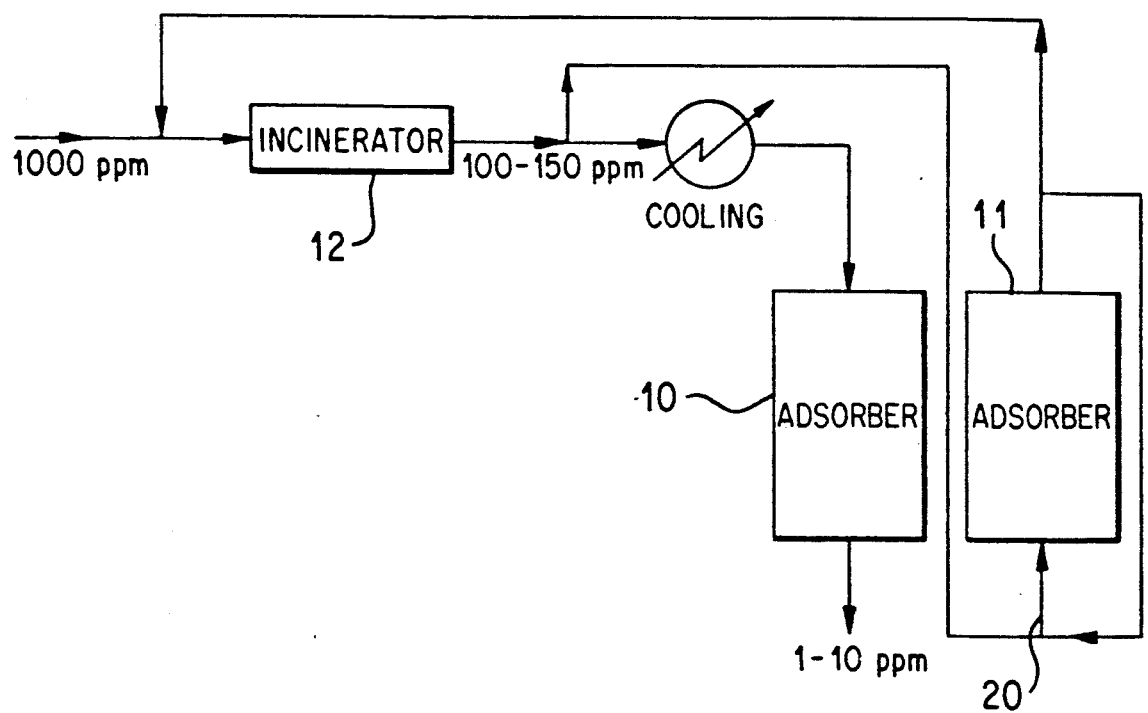
FIG. 6 is a schematic diagram of a polishing incinerator outlet.

Many incinerators, thermal, catalytic and especially recuperative incinerators, are unable to provide greater than 99% VOC's and/or HAP's removal efficiencies. Some incinerators require improvements at an order of magnitude higher cost to provide a greater than 99% removal efficiency. In such cases, it is possible to use the molecular sieves system described hereinabove as a polishing step. For example, in accordance with another embodiment of the process of this invention as shown in FIG. 6, a fluid stream on the order of about 100,000 cubic feet per minute containing high concentrations of solvents, on the order of 1,000 ppm, is introduced into incinerator 12, producing a treated fluid stream having a reduced concentration of solvents, on the order of 20–150 ppm. The treated fluid is introduced into adsorber 10 or 11 in which the concentration of solvents in the fluid is reduced to between about 1 to about 10 ppm. Although regeneration of the adsorbents would require about 8–15,000 cubic feet per minute of regeneration fluid flowing through process line 20 by known methods, the innovative approach of the process of this invention reduces the amount of regeneration fluid required for regeneration to 3–5,000 cubic feet per minute, thereby only minimally increasing the amount of additional throughput in the form of contaminant-laden regeneration fluid through incinerator 12. In accordance with this embodiment of the process of this invention, it is possible to modify an existing incinerator or design a new one to provide greater than 90% removal efficiencies, up to 99.99%. Internal streams are utilized for regeneration of the adsorbent, thereby enabling the incinerator to effectively destroy all of the incoming VOC's, even though the incinerator efficiency is less than 90%.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principals of the invention.

I claim:

1. A process for removal of contaminants from a fluid stream comprising:
    adsorbing said contaminants with an adsorbent, forming a contaminant-laden adsorbent;
    contacting said contaminant-laden adsorbent with a heated regeneration fluid, forming a contaminant-laden regeneration fluid;
    incinerating a first portion of said contaminant-laden regeneration fluid, forming products of combustion;
    mixing at least a primary portion of said products of combustion with a remaining portion of said contaminant-laden regeneration fluid forming a primary mixture of said remaining portion of said contaminant-laden regeneration fluid and said primary portion of said products of combustion;
    recirculating said primary mixture of said remaining portion of said contaminant-laden regeneration fluid and said primary portion of said products of combustion through said adsorbent, increasing the concentration of contaminants in said primary mixture and forming a recirculated primary mixture; and
    incinerating at least a portion of said recirculated primary mixture.

2. A process in accordance with claim 1, wherein a remaining portion of said recirculated primary mixture is mixed with at least a secondary portion of said products of combustion, forming a secondary mixture of said contaminants and said secondary products of combustion, and secondary mixture being recirculated through said adsorbent, increasing the concentration of said contaminants in said secondary mixture.

3. A process in accordance with claim 1, wherein said contaminants comprise at least one of volatile organic compounds (VOC's) and hazardous air pollutants (HAP's).

4. A process in accordance with claim 1, wherein said adsorbent is at least one of a hydrophobic molecular sieve and a hydrophobic zeolite.

5. A process in accordance with claim 1, wherein said adsorbent is disposed in at least two adsorbers, one adsorber of which is operated in an adsorption mode and the other of which is simultaneously operated in a regeneration mode.

6. A process in accordance with claim 1, wherein said heated regeneration fluid is heated directly by said products of combustion.

7. A process in accordance with claim 1, wherein said heated regeneration fluid is air.

8. A process in accordance with claim 1, wherein said primary mixture is depleted of oxygen.

9. In an adsorption/regeneration process for removal of contaminants from a fluid stream in which said contaminants are adsorbed by an adsorbent, a regeneration fluid is passed through said adsorbent desorbing at least a portion of said adsorbed contaminants forming desorbed contaminants, and said desorbed contaminants are separated from said regeneration fluid, the improvement comprising:
    incinerating a portion of said desorbed contaminants, forming products of combustion;
    mixing a remaining portion of said desorbed contaminants with at least a portion of said products of combustion forming a mixture of said desorbed contaminants and said products of combustion;
    recirculating said mixture of said desorbed contaminants and said products of combustion through said adsorbent, forming a recirculated mixture having an increased concentration of said desorbed contaminants; and
    incinerating said recirculated mixture.

10. In a process in accordance with claim 9, wherein said adsorbent is at least one of a hydrophobic molecular sieve and a hydrophobic zeolite.

11. In a process in accordance with claim 9, wherein said desorbed contaminants are initially desorbed by heated air.

12. In a process in accordance with claim 11, wherein said air is heated directly by said products of combustion.

13. In a process in accordance with claim 9, wherein said contaminants comprise at least one of volatile organic compounds and hazardous air pollutants.

14. A process for removal of contaminants from a fluid stream comprising:
    introducing said fluid stream into an incinerator, said incinerator incinerating at least a portion of said contaminants and forming contaminant-containing products of combustion;
    adsorbing at least a portion of said contaminants with an adsorbent, forming a reduced-contaminant fluid stream;
    regenerating said adsorbent with at least a portion of said reduced-contaminant fluid stream, forming a contaminant-laden regeneration fluid;
    mixing at least a portion of said contaminant-laden regeneration fluid with said reduced-contaminant fluid stream forming a mixture of said portion of said contaminant-laden regeneration fluid and said reduced-contaminant fluid stream and recirculating said mixture through said adsorbent; and
    recirculating a remaining portion of said contaminant-laden regeneration fluid through said incinerator.

15. A process in accordance with claim 14, wherein said adsorbent is at least one of a molecular sieve and a zeolite.

16. A system for removal of contaminants from a fluid stream comprising:
    at least one adsorber containing an adsorbent, said adsorber having a desorption fluid inlet and a desorption fluid outlet;
    válve means for separating a primary stream of a desorption fluid from said desorption fluid outlet into a plurality of desorption fluid streams in communication with said desorption fluid outlet;
    an incinerator in communication with said valve means;
    mixing means for mixing one of said plurality of desorption fluid streams with products of combustion from said incinerator forming a mixture of said one of said plurality of desorption fluid streams and said products of combustion, said mixing means in communication with said desorption fluid inlet; and
    means for introducing said mixture into said adsorber.

17. A system in accordance with claim 16, wherein said adsorbent is at least one of a hydrophobic molecular sieve and a hydrophobic zeolite.

* * * * *